United States Patent Office 3,000,393
Patented Sept. 19, 1961

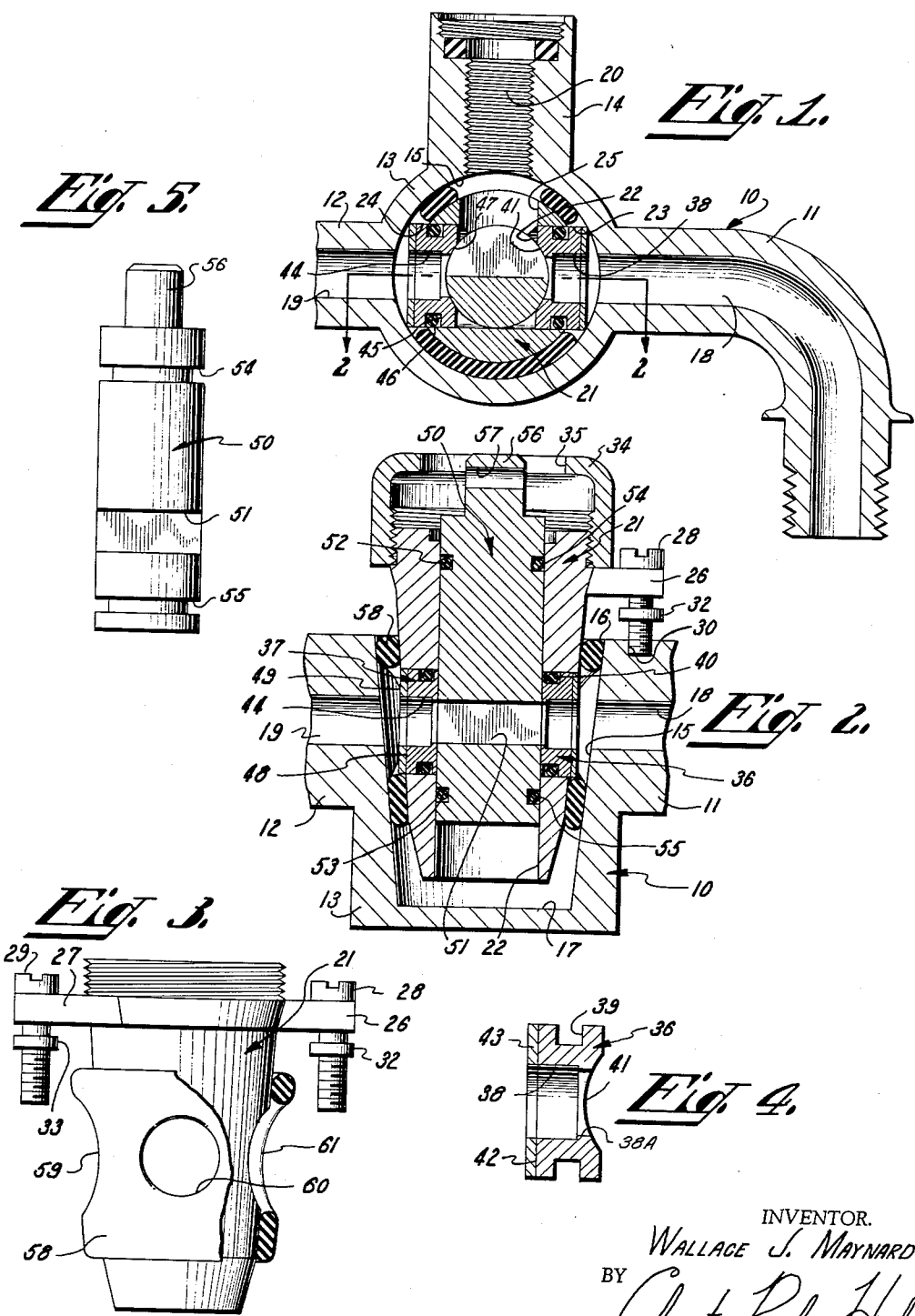

3,000,393
VALVE STRUCTURE
Wallace J. Maynard, 6219 San Ricardo Way,
Buena Park, Calif.
Filed May 25, 1959, Ser. No. 815,492
3 Claims. (Cl. 137—454.2)

This invention relates to a valve structure and particularly to a valve structure adaptable for mixing fluids.

Optimum utilization of a valve structure requires that the characteristic of repetitive effective sealing over a prolonged period of continuous use be combined with simplicity and economy of construction and maintenance. In addition, where a valve is to be used for mixing two or more fluids from separate sources, it is particularly desirable that variations in the mixing proportions be producible without change in the total volume of fluid outflow. A corollary requirement for a mixing valve is that a constant mixing proportion be maintainable while changes in the total volume of outflow are effected.

The features of dependable sealing effectiveness and the characteristics of mixing in various proportions at constant volume and changing of outflow volume at a constant mixing proportion are combined in the valve structure described in my copending application, Serial No. 712,706, filed February 3, 1958, now Patent No. 2,977,987. The present application is a continuation-in-part of my copending application, Serial No. 712,706, now Patent No. 2,977,987.

Ease and simplicity of maintenance of a valve structure is particularly achieved where ready accessibility to worn elements is attained. Furthermore, economy of construction is realized where the number of components in a structure is reduced to a minimum.

These features of maintenance and construction are combined in an improved manner in the valve structure of this invention together with the advantageous sealing and mixing characteristics of the valve structure described in my copending application. This is particularly achieved by embodying the operative wearable elements of the valve structure in an easily removable capsule or cartridge so that replacement of any worn elements may be conveniently made. Furthermore the capsule is adapted to coact with a valve body so that the sealing effectiveness and mixing characteristics of the operative elements are retained.

The valve structure according to the present invention comprises a body including flow passages for fluid inflow and outflow and a surface defining a central chamber. The flow passages of the body separately open into the chamber. A capsule adapted for insertion within the chamber defines capsule flow passages for fluid inflow and outflow and a cylindrical bore. The capsule includes a cylinder slidably fitted in the cylindrical bore and having a slotted portion in its surface, and a slidable insert plug fitted within the capsule inflow passage. The insert plug has an axial opening and one end face fitted to the curvature of the cylinder. The other end face of the insert plug is outside of the periphery of the capsule. Means are provided for positioning the capsule within the chamber of the body whereby the body flow passages and the capsule flow passages are substantially aligned and the other end face of the insert plug is pressed against the surface defining the central chamber so as to maintain the insert plug against the cylinder in sealing engagement. Resilient means are provided to furnish a fluid seal between the capsule and that surface defining the central chamber within the body.

The slotted portion of the cylinder is positioned along the longitudinal length of the cylinder whereby a part of the slotted portion mates with the opening of the insert plug when the valve is in a flow-enabling position.

In addition, the slotted portion of the cylinder is formed so that longitudinal movements of the cylinder both reciprocally and incrementally change the area available for flow from full open to full closed.

In the valve structure according to the present invention the face of the insert plug outside of the periphery of the capsule is of a material which can be deformed upon application of a force. The capsule and the central chamber are correspondingly tapered. Upon insertion of the capsule within the chamber of the valve body, a portion of the face outside of the periphery of the capsule is crushed in when the capsule is inserted to a certain position in the tapered central chamber. As a result, the insert plug is pressed between the surface defining the chamber and the cylinder and is maintained in sealing engagement against the cylinder. The sealing surface formed between the curved face of the insert plug and the surface of the cylinder is continuously lapped into close sealing contact as the cylinder is rotated in the course of its use. Effective sealing is thereby achieved for a long period of use particularly since the close contact between the face of the insert plug and the cylinder prevents the entry of foreign particles between these surfaces. When wear of an operative element occurs, the capsule is easily removed from within the valve body and, by reason of its accessibility, a new element is readily and simply substituted for the existing part.

When the valve structure according to the invention is used as a mixing valve, two inflow passages, each mating with a corresponding inflow passage in the valve body supplying a fluid from a separate source, are provided in the capsule. An insert plug having an axial opening from end to end is slidably fitted within each capsule inflow passage. The opening of each insert plug mates with a part of the slotted portion of the cylinder when the valve is in a flow-enabling position. In one embodiment the slotted portion of the cylinder is in flow-enabling engagement with one-half of each insert plug opening when the flow contribution from each of the inflow passages is equal. A rotational movement of the cylinder from this position diminishes the flow contribution from one inflow passage and increases the flow contribution from the other inflow passage. By properly shaping the cross-sectional areas of the slotted portion of the cylinder and the opening in the insert plug, the total area available for flow may be maintained constant while the proportionate flow contribution from each inflow passage is varied. In addition, a given proportion of flow contribution from the two flow passages may be maintained while the total volume is incrementally diminished or increased by reciprocal longitudinal movement of the cylinder in the cylindrical bore within the capsule.

The valve structure according to the present invention offers a significant advantage in facilitating access for replacement of worn parts. Furthermore, it eliminates the need for any means other than the structure of the capsule itself for maintaining insert plugs in sealing engagement against the cylinder. There is achieved, therefore, in addition to the ease of maintenance, simplicity of construction in that a minimum of parts and elements are required.

While not necessarily so limited, the valve structure according to the present invention is described below in an embodiment where two inflow passages are provided for mixing of two fluids. It is to be understood, however, that the sealing means of the valve structure and the concept of the capsule can also be used for the flow of one fluid in a single inflow passage. It is to be further understood that a variety of valve bodies, selected as required by styling, usage or the like, may be employed in conjunction with the capsule to be described.

The valve structure according to the present invention and its manner of operation will be more readily understood from the following description taken in conjunction with the accompanying drawings in which:

FIG. 1 is a fragmentary sectional elevation of one embodiment of the valve structure;

FIG. 2 is a fragmentary plan section of the embodiment of FIG. 1 generally taken along line 2—2 of FIG. 1;

FIG. 3 is an elevational view of the capsule of FIG. 1 removed from the valve body;

FIG. 4 is a sectional elevation of the insert plug of FIG. 1 removed from the valve body; and FIG. 5 is a plan view of the cylinder of FIG. 1 removed from the valve body.

With reference to FIGS. 1–5 one embodiment of a valve employing the valve structure according to the invention is shown. A valve body 10 comprises a first tubular member 11 and a second tubular member 12 disposed to extend horizontally from opposite sides of a central casing 13 of the valve body. A vertical riser 14 is joined to the central casing between horizontal members 11 and 12. The central casing of the valve body defines a horizontally-disposed generally frusto-conically shaped central chamber 15 which, as particularly shown in FIG. 2, tapers inwardly from an open end 16 to a closed end 17.

Tubular members 11, 12 define inflow passages 18, 19 respectively, which terminate at opposite sides of the central chamber. Similarly, vertical riser 14 defines an outflow passage 20 terminating at the central chamber. The outflow passage is spaced approximately 90° from each of the inflow passages and is vertically coplanar therewith. The outflow passage is provided with an internal thread to permit coupling with an outflow means such as, for example, a swing spout. The two inflow passages are separately connected to different fluid sources, as, for example hot and cold water.

A capsule, generally indicated by reference character 21, is provided with an external configuration having a taper generally corresponding to the taper of the central chamber. A cylindrical bore 22 axially traverses the capsule. A first capsule inflow passage 23 and a second capsule inflow passage 24 are formed within the capsule from the bore normal to the cylindrical bore and intersect the bore from opposite sides. A capsule outflow passage 25, spaced approximately 90° from each of the inflow passages and vertically coplanar therewith, also intersects the cylindrical bore. The inflow passages and outflow passage are positioned along the axial length of the capsule so that, when the capsule is inserted within the central chamber in the manner hereinafter described, inflow passages 23, 24 and outflow passage 25 of the capsule are substantially coaxially aligned with inflow passages 18, 19 and outflow passage 20, respectively, of the valve body.

The capsule is fitted near its enlarged end with two projecting spaced-apart lugs 26, 27. Bolts 28, 29 fitted through lugs 26, 27, respectively, are threadable into internally threaded bores in the valve body, bore 30 being shown in FIG. 2. Bolts 28, 29 are each provided with an intermediate head 32, 33, respectively, positioned on the threaded portion of the bolt between its lug and the valve body. The intermediate heads on the bolts are provided to assist in removing the capsule from the chamber by acting against the lugs upon rotation of the bolts in the proper direction. A cap 34 having a central aperture 35 is threadably fitted to the enlarged end of the capsule to provide an external closure.

Within capsule inflow passages 23, 24 are fitted cylindrical insert plugs 36, 37 respectively. The insert plugs are substantially identical and a description in detail of insert plug 36, as shown removed from within the inflow passage in FIG. 4, will serve to describe insert plug 37 as well. Insert plug 36 has a central longitudinal opening 38 extending from one end of the plug to the other, the opening at one end being adapted to have a square cross-section 38A. A circumferential recess 39 is formed in the plug and an O-ring 40 is fitted within the recess to form a fluid-tight seal between the wall of the inflow passage and the insert plug. One end face 41 of the plug is curved to fit the curvature of a cylindrical surface and the other end face 42 on the insert plug is flat. The portion of the longitudinal opening having a square cross section opens in the curved end face. In one embodiment of the invention, the body of the insert plug is made of stainless steel. With this embodiment, a pressure ring 43 of a malleable material such as lead, for example, is bonded to the flat face of the insert plug. The pressure ring has an aperture coinciding with the opening of the insert plug.

Insert plug 37 has a central longitudinal opening 44, identical to longitudinal opening of insert plug 36, a circumferential recess 45 within which is fitted an O-ring 46, a curved end face 47, a flat end face 48 and a pressure ring 49 bonded to the flat end face.

The length of the insert plugs is such that each occupies the length of its respective inflow passage with the pressure ring of each protruding outside of the periphery of the capsule. Each pressure ring has a squared edge.

A cylinder 50, having a length less than the length of the cylindrical bore of the capsule, is slidably fitted within the bore. A plan view of the cylinder, removed from the capsule, is shown in FIG. 5. A semi-circular segmental slot 51 is cut in the cylinder transverse to its longitudinal axis. The slot is longitudinally placed along the cylinder so that in one position, hereinafter referred to as the "full open" position, the entire width of the slot coincides with a portion of each insert plug opening. The width of the segmental slot is such that a longitudinal movement of the cylinder within the cylindrical bore, displacing it from the full open position to another position, hereinafter referred to as the "full closed" position, results in no portion of the slot coinciding with the insert plug openings. O-rings 52, 53 are fitted within circumferential recesses 54, 55 respectively located near opposite ends of the cylinder. In this manner, a fluid-tight seal between the cylinder and the wall of the cylindrical bore is provided at both ends of the cylinder. A tab 56 having a transverse aperture 57 is joined to one end of the cylinder and provides a means for fitting a suitable lever means to the cylinder for imparting rotational and longitudinal movements to it. The tab is accessible through aperture 35 of cap 34.

The curvature of end faces 41, 47 of insert plugs 36, 37 is adapted to fit the curvature of the cylindrical surface. The effect of a force acting against the pressure ring of each insert plug is to press the curved face of the plug into sealing engagement with the surface of the cylinder.

A jacketing gasket 58 is fitted over the capsule, as particularly shown in FIG. 3. The jacketing gasket has apertures 59, 60, 61 which coincide with the openings of inflow passages 23, 24 and outflow passage 25 in the peripheral surface of the capsule. The jacketing gasket is made of a resilient gasket material, as, for example, rubber treated with graphite to minimize seizure to the walls of the chamber.

In operation the capsule is fitted into the central chamber of the valve body by screwing bolts 28, 29 into the bores in the valve body and thereby inserting the capsule within the central chamber of the valve body. As the capsule advances inwardly within the chamber, the pressure rings of each of the insert plugs, protruding outside of the capsule peripheral surface, engage at their respective edges the inwardly tapering wall of the central chamber. Since these rings are made of a malleable material, the tightening of bolts 28, 29 results in the exertion of a force urging each of the insert plugs into sealing engagement against the cylinder. The internal taper of the chamber and external taper of the capsule correspond so that the rings contact the surface of the central chamber when the capsule flow passages are substantially aligned with the valve body flow passages 18, 19. In this position, the jacketing gasket is compressed between the peripheral surface of the capsule and the surface of the central chamber so that a seal is formed around each of the flow passages.

When wear of any operative element of the capsule occurs, the bolts are unscrewed and, through the action of intermediate heads 32, 33, the capsule is withdrawn from the central chamber so that the insert plugs or any other worn operative elements may be replaced.

The operation of the valve to vary the proportion of flow contribution from the first and second fluid inflow passages respectively may be best understood by reference to FIG. 1 previously described. When the flow contribution from each of the flow passages is equal, the segmental slot of the cylinder is positioned so that it is in flow-enabling engagement with one-half of each of the insert plug openings. The remaining halves of the insert plug openings are pressed against the blank surface of the cylinder. In this position, the segmental slot provides flow communication between each of the inflow passages and the outflow passage and also acts as an initial mixing chamber. The proportionate flow contribution of the two inflow passages may be varied by rotating the cyinder in either a clockwise or counter-clockwise direction. For example, a clockwise rotation of the cylinder from the position shown in FIG. 1 increases the area of insert plug opening 38 in flow-enabling engagement with the segmental slot and proportionately decreases the area of insert plug opening 44 in flow-enabling engagement with the slot. The proportion of fluid from the second inflow passage in the outflow mixture is correspondingly increased. Since, however, the insert plug openings of the preferred embodiment of the valve are square, the total area in flow-enabling engagement with the slot remains constant. In this manner, the total volume of outflow fluid remains constant although the proportionate flow contribution from the two inflow passages is varied. In addition, small changes in the mixing proportion may be readily made.

The operation of the valve to vary the total volume of fluid outflow without affecting a previously-set mixing proportion may be readily understood by reference to FIG. 2 previously described. In the position shown, the valve is fully open since the entire width of the slot is in flow-enabling engagement with the two insert plug openings. A longitudinal outward movement of the cylinder (upwardly as shown in the drawing) decreases the total area in flow-enabling engagement with the insert plug openings while the area of the slot in engagement with each of the insert plug openings remains proportionately the same. By longitudinal movements of the cylinder, the total outflow of fluid may be incrementally increased or decreased or it may be completely stopped.

While not shown, a suitable lever means is fitted through aperture 57 in tab 56 of cylinder 50. A lever means such as described in my copending application identified above provides a covenient means for both longitudinal and rotational movements of the cylinder. The means by which the cylinder is either rotated or longitudinally displaced is not a part of the present invention and any suitable device may be used. Similarly, the relationship of the shape and size of the openings in each of the insert plugs to the slotted portion of the cylinder may be varied in accordance with the modifications described in the above-identified copending application.

While the insert plugs described with respect to the embodiment shown in FIGS. 1-5 are of stainless steel to which a malleable material is bonded, the body of the plug may be made of a material such as plastic for example which of itself is sufficiently deformable so that no added ring is required. Other deformable materials suitable for maintaining the insert plug against the cylinder when the capsule is inserted within the central chamber may also be employed within the concept of the invention.

The present invention has the particular advantage that all of the operative elements of the valve structure are embodied in a readily removable capsule. Furthermore, the capsule is formed whereby its insertion results in the exertion of a force against normally removable and slidable insert plugs. The capsule, therefore, coacts with the valve body to exert a force against the insert plugs which otherwise would require either a resilient spring or reliance upon the fluid pressure. It can be seen further that the insert plugs are retained in position within the respective capsule inflow passages even though there is a removal of fluid pressure on one side of the valve. As a consequence, the fluid pressure of a second fluid will not displace the insert plug from its flow passage.

It will be understood that other modifications may be made without departing from within the concept herein disclosed and that the present invention is not limited to the specific embodiment described to illustrate the invention.

I claim:

1. A valve structure comprising a body including two inflow passages, an outflow passage and a surface defining a central tapered chamber, the inflow passages opening into the chamber from substantially opposite sides and the outflow passage opening into the chamber between the inflow passages; a capsule tapered to correspond to the chamber for insertion therein, said capsule defining two capsule inflow passages, a capsule outflow passage and a cylindrical bore, and including a cylinder slidably fitted in the cylindrical bore and having a flow-enabling opening in its surface, and an insert plug slidably fitted within each of the capsule inflow passages, each of said insert plugs having an axial opening and one end face fitted to the curvature of the cylinder and a length whereby the other end face is outside of the peripheral surface of the capsule; means for positioning the capsule within the cavity whereby the body flow passages and capsule flow passages are substantially coaxially aligned and the other end face of each insert plug is pressed against the surface of the body defining the central chamber to maintain the respective insert plugs against the cylinder in sealing engagement; and resilient means for providing a fluid seal between the capsule and the surface of the body defining the central chamber.

2. Apparatus in accordance with claim 1 wherein the insert plugs are formed from a resilient organic plastic material.

3. A valve structure comprising a body including two inflow passages, an outflow passage and a surface defining a central tapered chamber, the inflow passages separately opening into the chamber from substantially opposite sides and the outflow passage opening into the chamber between the inflow passages; a capsule tapered to correspond to the chamber for insertion therein, said capsule defining two capsule inflow passages, a capsule outflow passage and a cylindrical bore, and including a cylinder slidably fitted in the cylindrical bore and having a slotted portion in its surface, an insert plug slidably fitted within each of the capsule inflow passages, each of said insert plugs having an axial opening, one end face fitted to the curvature of the cylinder, and a ring of malleable material bonded to the other end face to extend outside of the peripheral surface of the capsule; means for positioning the capsule within the chamber whereby the body flow passages and capsule flow passages are substantially aligned and the ring of each insert plug is pressed against the surface of the body defining the central chamber to maintain the respective insert plugs against the cylinder in sealing engagement; and resilient means for providing a fluid seal between the capsule and the surface of the body defining the central chamber.

References Cited in the file of this patent

UNITED STATES PATENTS

| | | |
|---|---|---|
| 2,769,456 | Atkinson | Nov. 6, 1956 |
| 2,839,083 | Moen | June 17, 1958 |
| 2,864,580 | Lemoine | Dec. 16, 1958 |
| 2,885,179 | Hartmann | May 5, 1959 |
| 2,892,610 | Graham | June 30, 1959 |

FOREIGN PATENTS

| | | |
|---|---|---|
| 503,657 | Germany | July 24, 1930 |